(12) United States Patent
Patience

(10) Patent No.: US 9,493,233 B2
(45) Date of Patent: Nov. 15, 2016

(54) CAVITY ACOUSTIC TONES SUPPRESSION

(71) Applicant: BAE SYSTEMS PLC, London (GB)

(72) Inventor: David Euan Patience, Frimley (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 14/776,115

(22) PCT Filed: Mar. 13, 2014

(86) PCT No.: PCT/GB2014/050761
§ 371 (c)(1),
(2) Date: Sep. 14, 2015

(87) PCT Pub. No.: WO2014/140590
PCT Pub. Date: Sep. 18, 2014

(65) Prior Publication Data
US 2016/0031548 A1    Feb. 4, 2016

(30) Foreign Application Priority Data

Mar. 15, 2013  (EP) ..................................... 13275065
Mar. 15, 2013  (GB) .................................. 1304718.8

(51) Int. Cl.
*B64C 23/06*    (2006.01)
*B64C 23/00*    (2006.01)

(52) U.S. Cl.
CPC ......... *B64C 23/005* (2013.01); *B64C 2230/08* (2013.01); *Y02T 50/166* (2013.01)

(58) Field of Classification Search
CPC .................. B64C 21/02; B64C 23/005; B64C 2025/003; B64C 2230/08
(Continued)

(56) References Cited

U.S. PATENT DOCUMENTS 2,451,479 A    10/1948   Diehl
2,663,993 A    12/1953   Mosser
(Continued)

FOREIGN PATENT DOCUMENTS

DE    3534268 A1    4/1987
DE    3609541 A1    9/1987
(Continued)

OTHER PUBLICATIONS

EP Search Report dated Oct. 11, 2013 of Patent Application No. 13275064.7 filed Mar. 15, 2013.
(Continued)

*Primary Examiner* — Jeremy Luks
(74) *Attorney, Agent, or Firm* — Maine Cernota & Rardin

(57) ABSTRACT

A cavity system that tends to increase the thickness (28) of the shear layer (22), comprising: a cavity (2) and a plurality of rods (4), for example between two and six rods; the rods (4) are positioned in the proximity of a leading edge (14) of the cavity (2) and extending across at least a part of a width of the cavity (2) in a perpendicular or oblique angle to the actual or intended flow direction (6). One or more of the rods (4) may be positioned further along the flow direction (6) compared to one or more of the other rods (4), for example to provide a zig-zag pattern of rod positions. One or more flow alteration elements (34, 38), for example channels (34) passing through the rods (4) and/or protrusions (38) extending from the rods (4), may be provided on one or more of the rods (4).

20 Claims, 5 Drawing Sheets

(58) Field of Classification Search
USPC .................. 181/286, 293; 244/130, 137.1
See application file for complete search history.

(56) References Cited

U.S. PATENT DOCUMENTS

| | | | |
|---|---|---|---|
| 2,749,064 | A | 6/1956 | Kuhlman, Jr. |
| 5,340,054 | A | 8/1994 | Smith |
| 5,699,981 | A | 12/1997 | McGrath |
| 6,296,202 | B1 | 10/2001 | Stanek |
| 6,739,554 | B1 | 5/2004 | Stanek |
| 2002/0079405 | A1 | 6/2002 | Layukallo |
| 2002/0190164 | A1* | 12/2002 | Loth .............. B64C 21/025 244/204 |
| 2008/0217485 | A1 | 9/2008 | Ikeda |
| 2009/0045286 | A1 | 2/2009 | King et al. |
| 2009/0045289 | A1 | 2/2009 | Bilanin et al. |

FOREIGN PATENT DOCUMENTS

| | | |
|---|---|---|
| DE | 102005007940 A1 | 8/2006 |
| EP | 0673819 A1 | 9/1995 |
| GB | 614274 A | 12/1948 |
| JP | 2002205639 A | 7/2002 |

OTHER PUBLICATIONS

GB Search Report dated Jul. 24, 2013 of Patent Application No. 1304716.2 filed Mar. 15, 2013.
EP Search Report dated Nov. 13, 2013 of Patent Application No. 13275065.4 filed Mar. 15, 2013.
GB Search Report dated Jul. 24, 2013 of Patent Application No. 1304718.8 filed Mar. 15, 2013.
EP Search Report dated Jul. 16, 2013 of Patent Application No. 13275066.2 filed Mar. 15, 2013.
GB Search Report dated Jul. 24, 2013 of Patent Application No. 1304722.0 filed Mar. 15, 2013.

* cited by examiner

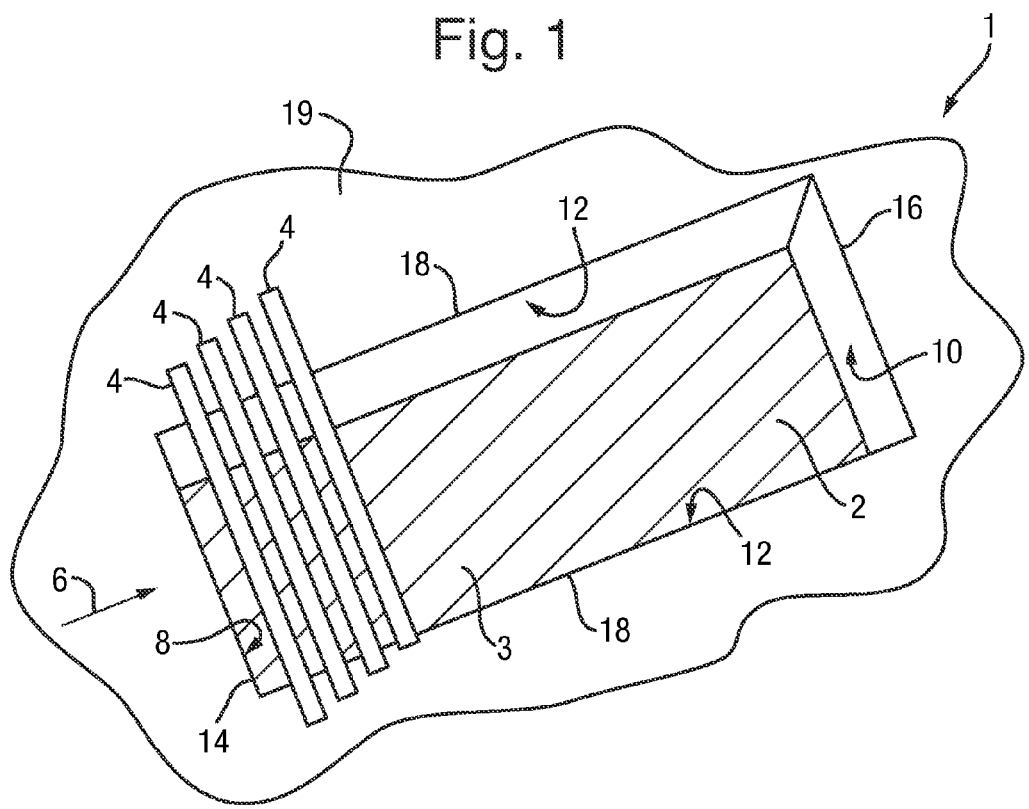
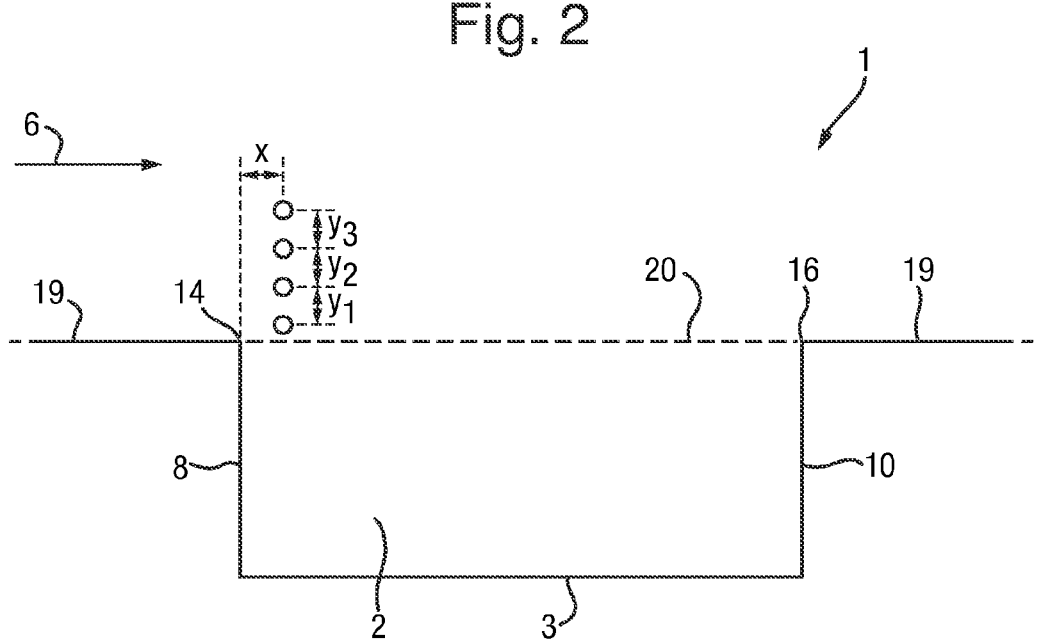

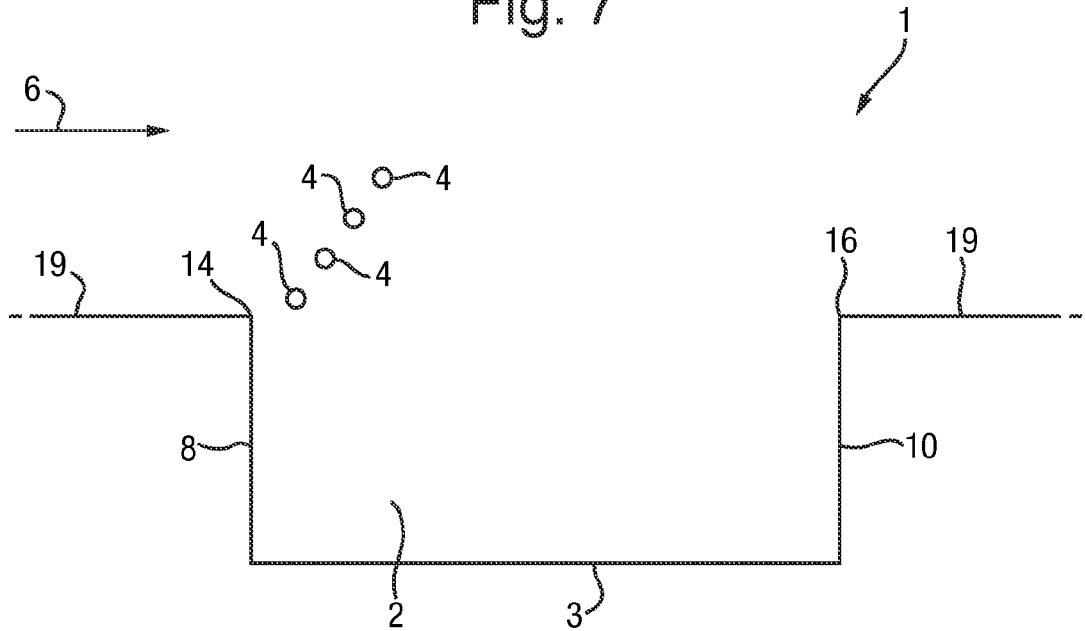
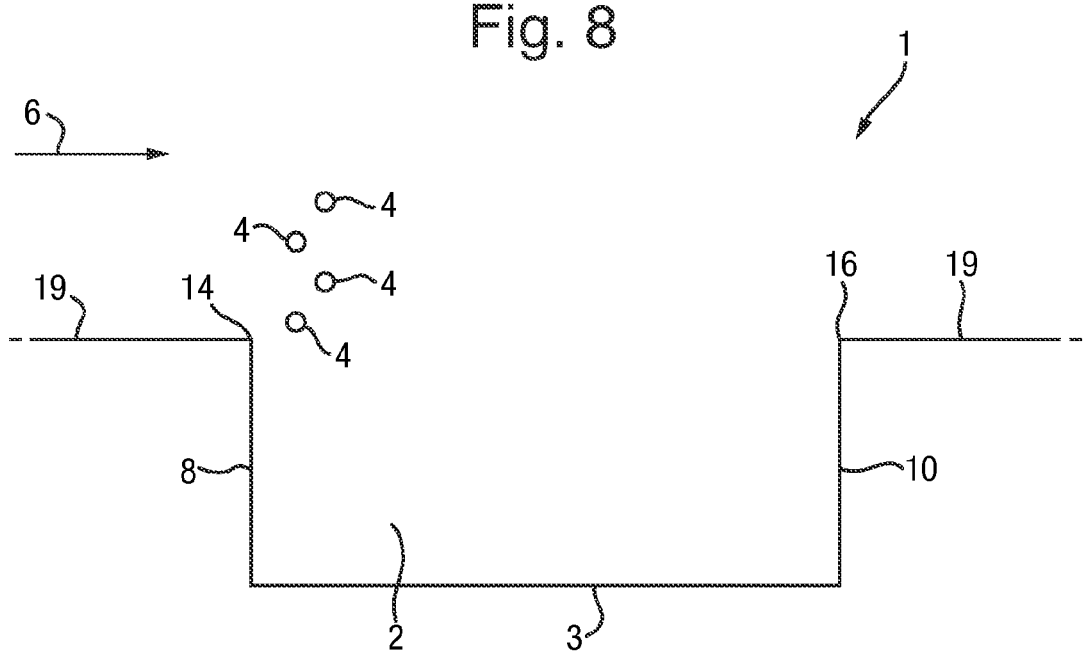

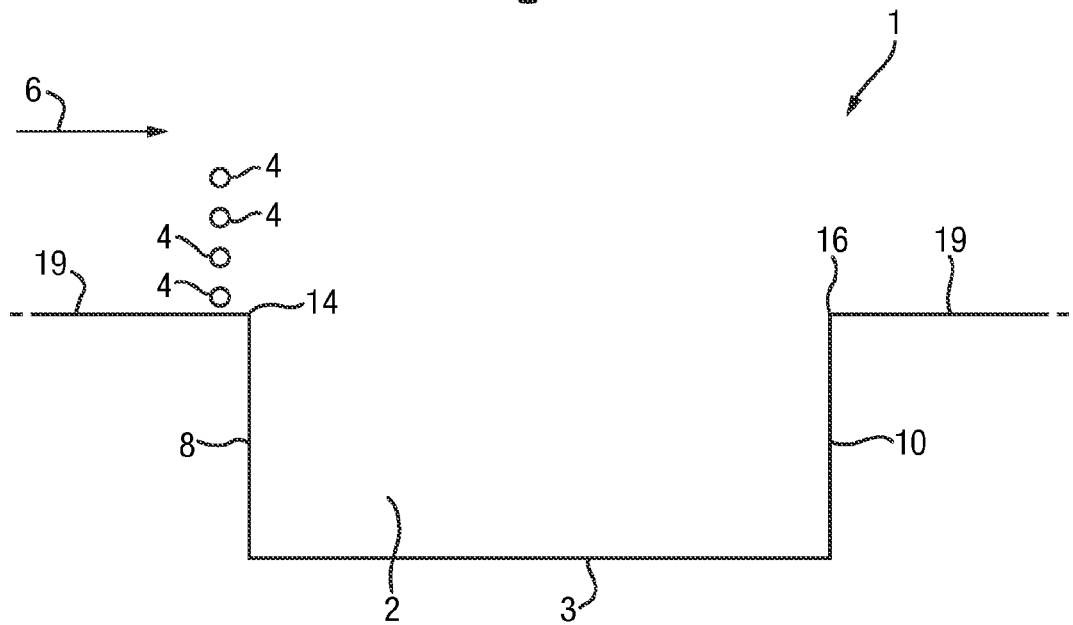
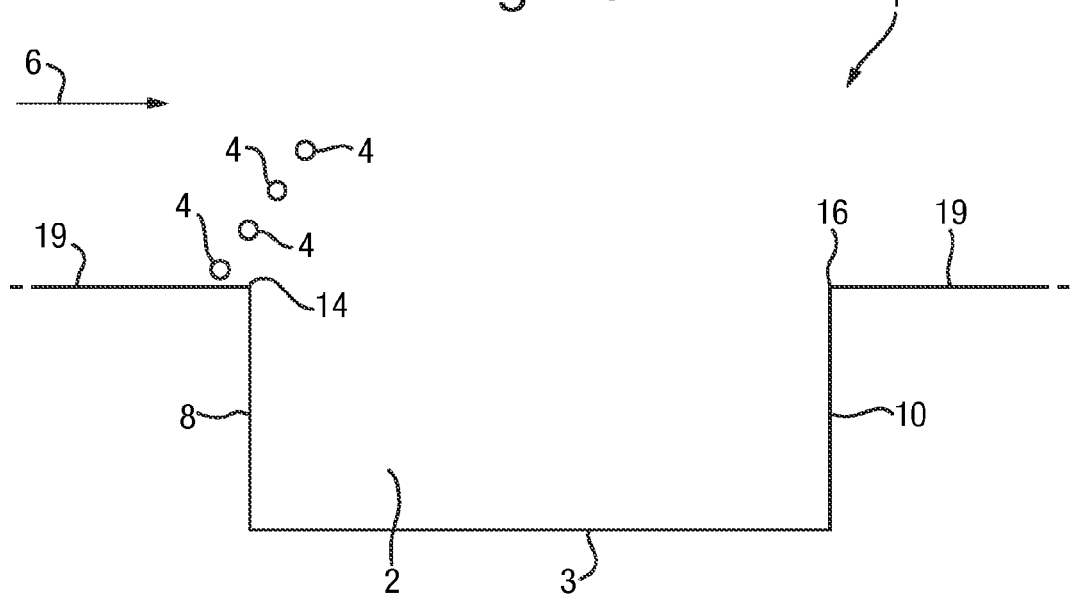

CAVITY ACOUSTIC TONES SUPPRESSION

RELATED APPLICATIONS

This application is a national phase application filed under 35 USC §371 of PCT Application No. PCT/GB2014/050761 with an International filing date of 13 Mar. 2014 which claims priority of GB Patent Application 1304718.8 filed 15 Mar. 2013 and EP Patent Application 13275065.4, filed 15 Mar. 2013. Each of these applications is herein incorporated by reference in their entirety for all purposes.

FIELD OF THE INVENTION

The present invention relates to methods and systems for suppression of acoustic tones and/or resonance and/or other acoustic tone effects in cavities for when they are moving relative to an ambient fluid. The present invention relates in particular to, but is not limited to, such methods and systems for cavities recessed in a surface, for example in a surface of a vehicle, for example aircraft cavities, for example bays, when the aircraft is travelling through air.

BACKGROUND

Considering the case of a surface with a cavity recessed in the surface, when the surface, and hence the recessed cavity, is moving in ambient fluid, for example when an aircraft with an open bay, for example an open weapons bay or an open undercarriage bay, is moving in air, a shear layer is formed between (i) the moving ambient air that is flowing across the surface and across the top of the recessed cavity, and (ii) the static air in the cavity (from the reference point of the aircraft). A vortex is shed from the cavity leading edge and grows as it travels down the shear layer and impacts on the aft (trailing) wall of the bay resulting in the emission of noise. Also the acoustic wave travels back upstream inside the bay. The fluctuating pressure of the acoustic wave may either result in vortices being shed from the leading edge cavity lip or an increase in the growth rate of the vortices such that a series of vortices is formed down the shear layer at a preferential rate which is related to the frequency of the upstream acoustic wave. The vortices grow into large scale structures as they propagate downstream in the shear layer and then impact the aft (trailing) wall of the bay at a characteristic rate. This results in acoustic noise being generated at a characteristic rate which may be described as acoustic tones of a characteristic frequency.

The frequency of the tones may be formulated using Rossiter's equation. It can be seen that there is a feedback loop formed by the passage of the vortices and the upstream propagating acoustic wave.

U.S. Pat. No. 5,699,981 discloses an aircraft cavity acoustic resonance suppression system which comprises a small diameter, substantially cylindrically shaped member disposed substantially parallel to and spaced up to a distance corresponding to about three airflow boundary layer thicknesses from the surface of an aircraft near the leading edge of the cavity and transverse to airflow thereacross. An actuator is provided to select the adjustment of the spacing between the member and the aircraft surface according to different operational speeds and hence different operational boundary layer thicknesses as the member's spacing of about three airflow boundary layer thicknesses from the surface of the aircraft is disclosed as critical.

More generally, air intakes or other tunnel like arrangements are known. Such arrangements, even if considered as including a cavity as such, do not include cavities that are of the type being addressed in the present invention, which on the contrary include cavities recessed in a surface.

SUMMARY OF THE INVENTION

The present inventor has realised that it would be desirable to provide a form of suppression by generating multiple fine scale turbulances i.e. resulting in multiple small vortices, within the shear layer, thereby disrupting the formation of large scale vortices in the shear layer which are part of the tone generation process, and moreover to provide that the multiple fine scale turbulances tend not to combine into larger ones. The present inventor has further realised that one way, for example, to deter the combination of the fine scale turbulence into larger ones would be to increase the thickness of the shear layer formed at the cavity (note for example, that in contrast the prior art arrangement disclosed in U.S. Pat. No. 5,699,981 does not have a tendency to thicken the shear layer). The present inventor has realised that, conventionally, an upstream acoustic wave interacts with the vortices in the shear layer at approximately common times i.e. they display a temporal coherence. The present inventor has realised that in contrast, by providing a thicker shear layer, the vortices closer to the stream flow will propagate downstream faster than those closer to the static air in the bay. The present inventor has realised that therefore at some point downstream the vortices will arrive at different times to each other. The present inventor has realised that this loss of temporal coherence will disrupt the formation of the conventional large scale turbulent structures that would otherwise play a key role in the generation of unwanted acoustic tones. The present inventor has further realised that it would be desirable to provide a suppression system comprising elements that readily accommodated differing boundary layer thicknesses without requiring positional adjustment, unlike the system disclosed in U.S. Pat. No. 5,699,981.

In a first aspect, the present invention provides a cavity system, comprising: a cavity and a plurality of rods; the rods are positioned in the proximity of a leading edge of the cavity, the leading edge being relative to an actual or intended flow direction of a fluid over the cavity; the rods extending across at least a part of a width of the cavity in a perpendicular or oblique angle to the actual or intended flow direction.

The cavity may be a cavity recessed in a surface. The surface may be a surface comprised by a vehicle. The vehicle may be an aircraft, or a missile, or any other type of vehicle, for example a car or a lorry, or a sea vessel, including for example a submarine.

The cavity system may be arranged with all the rods downstream of the leading edge.

One or more of the rods may be positioned further along the flow direction compared to one or more of the other rods. The positioning of one or more of the rods further along the flow direction compared to one or more of the other rods may provide a zig-zag pattern of rod positions.

One or more flow alteration elements may be provided on one or more of the rods.

At least some of the flow alteration elements may comprise or provide additional edges at the one or more rods that are in addition to the edge or edges provided by the underlying shape of the rod or rods.

At least some of the flow alteration elements may comprise a channel passing through the rod.

At least some of the flow alteration elements may comprise a protrusion extending from the rod.

Flow alteration elements may be at different positions along the rod on different rods.

At least two different types of flow alteration elements may be provided.

The rods may be positioned at a distance from the leading edge that is ≤0.2×the distance between the leading edge and an aft edge.

The rods may be positioned at a distance from the leading edge that is ≤0.1×the distance between the leading edge and the aft edge.

The rods may be positioned at a distance from the leading edge that is ≤0.05×the distance between the leading edge and the aft edge.

The number (n) of rods in the plurality may be 2≤n≤6.

The number (n) of rods in the plurality may be 3≤n≤6.

The effect of the rods may be to increase the thickness of the shear layer.

BRIEF DESCRIPTION OF THE DRAWINGS

FIG. 1 is a schematic illustration (not to scale) of a perspective view of a cavity acoustic tones suppression system;

FIG. 2 is a schematic cross-sectional view (not to scale) of the suppression system of FIG. 1;

FIG. 7 is a schematic cross-sectional view (not to scale) of a suppression system in which all the rods are offset from each other;

FIG. 8 is a schematic cross-sectional view (not to scale) of a suppression system in which some of the rods are offset from some but not all of the other rods;

FIG. 9 is a schematic cross-sectional view (not to scale) of a suppression system in which all of the rods are positioned upstream of the leading edge of a cavity; and FIG. 10 is a schematic cross-sectional view (not to scale) of a suppression system in which some of the rods are positioned upstream of the leading edge of a cavity and some of the rods are positioned downstream of the leading edge of the cavity.

DETAILED DESCRIPTION

Figure 3:
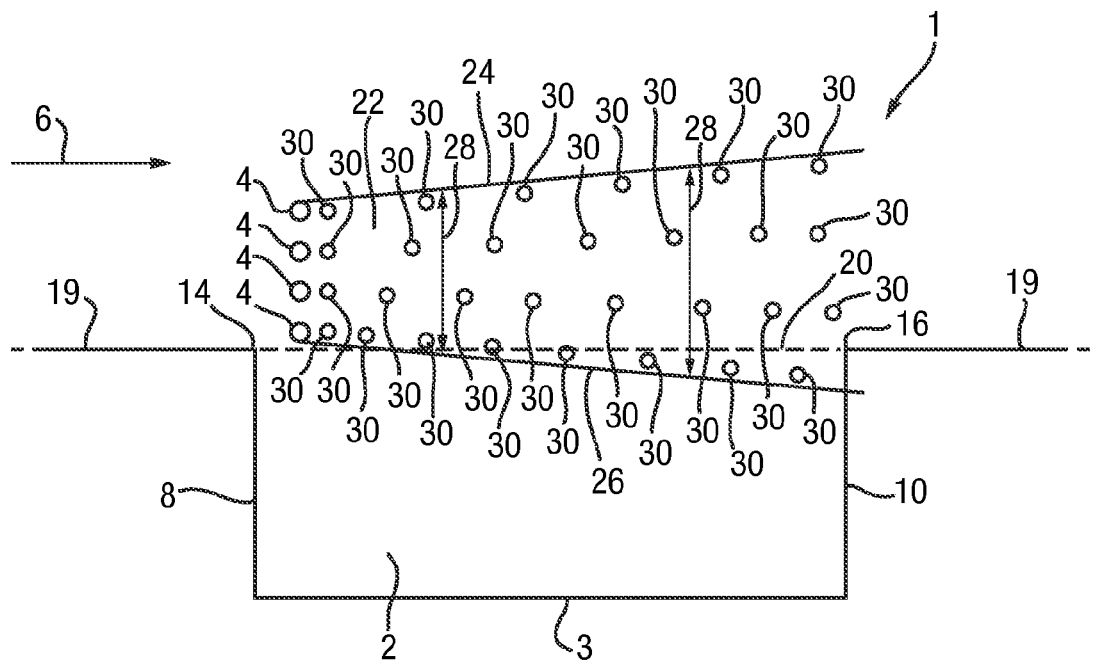
FIG. 3 is a further schematic cross-sectional view (not to scale) of the suppression system 1 of FIGS. 1 and 2.

It will be appreciated that relative terms such as horizontal and vertical, top and bottom, above and below, front and back, and so on, are used above merely for ease of reference to the Figures, and these terms are not limiting as such, and any two differing directions or positions and so on may be implemented rather than truly horizontal and vertical, top and bottom, and so on. In particular, for convenience, in the Figures a cavity is shown with it opening at the top of the page, and so for convenience the word "top" is used to mean the opening of the cavity, and the word "above" means further away from the cavity, However, it will be appreciated that the present invention refer also to cavities positioned for example underneath the wing or fuselage of e.g. an aircraft, i.e. upside down to that shown in the Figures, but the description use of the word "top" will still refer to the opening part of the cavity and that of the word "above" will still refer to being away from the cavity.

FIG. 1 is a schematic illustration (not to scale) of a perspective view of a first embodiment of a cavity acoustic tones suppression system 1 (hereinafter referred to as the suppression system 1). The cavity acoustic tone suppression system comprises a cavity 2 and a plurality of rods 4. In this embodiment the cavity 2 is in a surface 19. In this embodiment the number of rods 4 in the plurality of rods 4 is four.

In this embodiment the cavity 2 is a cavity 2 recessed in a surface 19 of an aircraft (in FIG. 2 the external boundary of the surface 19 is schematically identified by a zig-zag line to indicate in conventional drawing-style form that the extent of the surface 19 being schematically shown is not necessarily limited to the drawing page). The surface 19 is substantially planar, although not necessarily flat and not necessarily without non-uniformities or items fixed thereto. In this embodiment, the cavity 2 is rectangular and comprises a planar base 3. In FIG. 1 the planar base 3 is schematically shown in hatched shading. The cavity 2 further comprises, defined relative to an actual or intended flow direction 6 (the flow direction 6 being across, or over, the surface 19 and the cavity 2), a leading wall 8, an aft (trailing) wall 10, and two side walls 12. In this embodiment these walls are all perpendicular to the planar base 3. At the top of the cavity 2, the cavity 2 comprises, for each of these walls respectively, a leading edge 14, an aft (trailing) edge 16, and two side edges 18.

In this embodiment, the rods 4 extend across the width of the cavity, i.e. in a transverse (i.e. perpendicular) (or in other embodiments, in an oblique angle) direction to the flow direction 6, i.e. in this embodiment parallel with the front and aft (trailing) edges and walls.

In this embodiment the rods 4 are positioned downstream of the leading edge 14 (i.e. above the cavity 2), and the rods 4 are positioned closer to the leading edge 14 than they are to the aft (trailing) edge 16. More particularly, in this embodiment the rods 4 are positioned such that the distance of the rods 4 from the leading edge 14 in the flow direction equals 0.05×the total distance between the leading edge 14 and the aft (trailing) edge 14.

FIG. 2 is a schematic cross-sectional view (not to scale) of the suppression system 1 of FIG. 1. Elements of the system shown in FIG. 2 that were also shown in FIG. 1 are the following: the cavity 2, the planar base 3, the plurality of rods 4, the flow direction 6, the leading wall 8, the aft (trailing) wall 10, the leading edge 14, the aft (trailing) edge 16, and the surface 19 (which may also be considered as the plane of the surface).

As can be further appreciated from FIG. 2, a gap or major change in orientations in the surface 19 in effect provides the opening of the cavity 2, and the cavity 2 is in the form of a recess in the surface 19. It is noted that the terminology "cavity recessed in a surface" as used herein includes cases where the overall effect or geometry of the cavity is that it will be recognised as a "cavity recessed in a surface", even if strictly speaking the surface 19 and/or one or more of the walls 8, 10, 12 and/or the planar base 3 are not made from a single continuous piece or type of material.

Also shown (in dotted line form) in FIG. 2 for ease of explanation later below is a hypothetical extension 20 of the surface 19 over the cavity 2.

Also shown in FIG. 2 is a schematic (not to scale) indication of the spacing or distance x (in the direction along the cavity i.e. in the flow direction) of the rods 4 from the leading edge 14.

In this embodiment, as shown schematically (not to scale) in FIG. 2, all the rods 4 are positioned directly above each other, i.e. each rod 4 is positioned at substantially the same distance x (in the direction along the cavity i.e. in the flow direction) from the leading edge 14.

The rods 4 may be held in position by any suitable fixture or fixing, attached either to the surface in which the cavity is formed, or any other appropriate part of the vehicle containing the cavity. Preferably the fixture is sized and located such as to avoid or at least minimise any impact on the operational effect of the rods regarding the cavity 2. For example, the rods may be mounted on or through a vertical bar or plate at or close to the ends of the rods.

In this embodiment the rods 4 are all of circular cross-sectional shape.

In this embodiment the rods are all of the same (circular) cross-sectional shape as each other, and are all of the same diameter as each other.

In this embodiment the rods each have a uniform cross-sectional shape along their entire length.

In this embodiment the rods 4 all extend completely across the width of the cavity 2.

In this embodiment the rods 4 are all the same length as each other and extend across the same extent of the width of the cavity as each other.

In this embodiment the rods 4 are all spaced equidistantly apart from the adjacent rod 4 in the sense of the height direction, i.e. in the direction that extends away from the base 3 of the cavity 2 (and perpendicular to the flow direction 6), i.e. as shown schematically (not to scale) in FIG. 2 the respective distances $y_1=y_2=y_3$.

The tendency of the suppression system 1 to suppress acoustic tones when in operation will now be described with reference to FIG. 3. FIG. 3 is a further schematic cross-sectional view (not to scale) of the suppression system 1 of FIGS. 1 and 2 (and indeed shows the same view as FIG. 2, but for clarity omits certain features and reference numerals from FIG. 2). Elements of the system shown in FIG. 3 that were also shown in FIG. 1 and/or FIG. 2 are the following: the cavity 2, the planar base 3, the plurality of rods 4, the flow direction 6, the leading wall 8, the aft (trailing) wall 10, the leading edge 14, the aft (trailing) edge 16, the surface 19 that surrounds the cavity 2, and the hypothetical extension 20 of the surface 19 over the cavity 2.

In operation, one effect of the plurality of rods 4 is to tend to increase the thickness of the shear layer 22 compared to if the rods 4 were not present. This is at least in part due to the rods presenting a blockage to the air flow to deflect the flow both in and out of the cavity, due at least in part to the presence of more than one rod 4. The shear layer 22 is represented schematically in FIG. 2 as the region between a line representing the top 24 (i.e. furthest away from the cavity 2) of the shear layer 22 and a line representing the bottom 26 (i.e. closest to the cavity 2) of the shear layer. The thickness 28 of the shear layer 22 at any point along the cavity 2 is correspondingly the distance between the top 24 of the shear layer 22 and the bottom 26 of the shear layer 22.

In operation, a further effect of the plurality of rods 4, in particular the presence of more than one rod at different heights, is to tend to provide multiple sources of fine scale turbulence giving rise to a plurality of small vortices 30 at differing heights. Due at least in part to the thicker shear layer 22, in particular the plurality of heights at which the vortices are shed due to the different heights of the different rods 4, the vortices 30 tend not to combine into larger ones. By provision of the thicker shear layer 22, and the plurality of heights at which the vortices are shed due to the different heights of the different rods 4, the vortices 30 closer to the top 24 of the shear layer 22 (i.e. closer to the ambient fluid flow) propagate downstream faster than those vortices 30 closer to the bottom 26 of the shear layer 22 (i.e. closer to the static air in the cavity 2). Accordingly the vortices 30 arrive at given points downstream at different times i.e. there is a loss of temporal coherence, and consequently there is a disruption of the conventional tendency for formation of large scale turbulent structures that would otherwise play a key role in the generation of unwanted acoustic tones. Furthermore by virtue of the additional height achieved in total by use of plural vertically spaced rods 4, differing boundary layer thicknesses tend to be readily accommodated (without requiring positional adjustment).

In further embodiments, flow alteration elements are provided on one or more (preferably all) of the rods 4. The flow alteration elements may increase the deflection of the vortices 30 into and/or out of the cavity 2, thereby further enhancing the thickening of the shear layer 22. The flow alteration elements may additionally or alternatively serve as additional sources of fine scale turbulence giving rise to yet further small vortices 30, hence tending to provide yet further loss of temporal coherence.

Figure 4:
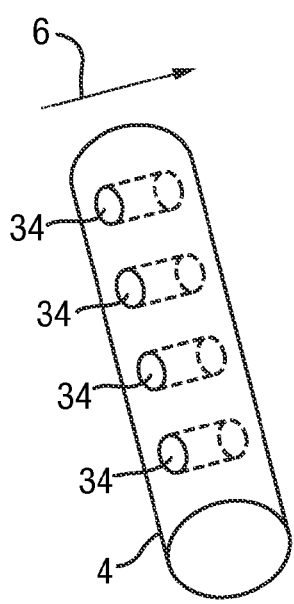
FIG. 4 is a perspective view of a rod with flow alteration elements provided on it.
Figure 5:
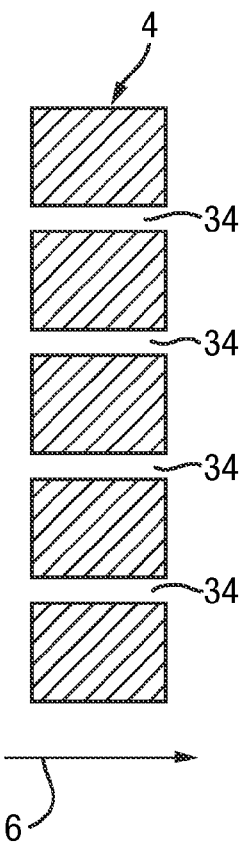
FIG. 5 is a cross-sectional view of the rod of FIG. 4.

FIGS. 4 and 5 are a schematic illustration (not to scale) of a rod 4 of one such embodiment with flow alteration elements provided on one or more (preferably all) of the rods 4. FIG. 4 is a perspective view of the rod 4, and FIG. 5 is a cross-sectional view of the rod 4.

The rod 4 includes a series of channels 34 (i.e. in this embodiment the flow alteration elements are the channels 34) passing through the rod 4 (either parallel to the flow direction 6 or at an oblique angle to the flow direction 6) and arranged such that in operation some of the fluid impacting the rod 4 passes through the channel 34 and some of the fluid is diverted around the rod 4, thereby providing additional sources of fine scale turbulence (hence additional vortices 30) and/or increasing the deflection of the vortices 30 into and/or out of the cavity 2, thereby further enhancing the thickening of the shear layer 22.

In this embodiment, the channels are arranged with their openings spaced equally apart in a single straight line along the length of the rod. However this need not be the case, and in other embodiments the channel openings are may be placed at unequal distances and/or in more than one straight line and/or with some or all of them not arranged in straight lines.

Figure 6:
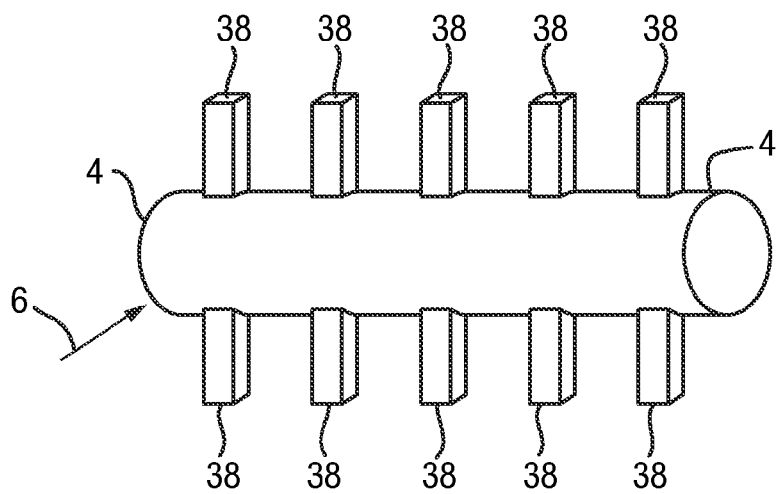
FIG. 6 is a perspective view of a rod with flow alteration elements provided on it.

FIG. 6 is a schematic illustration (not to scale), of a rod 4 of a further such embodiment with flow alteration elements provided on one or more (preferably all) of the rods 4. The rod 4 is shown in a perspective view.

The rod 4 includes a plurality of protrusions 38, serving as the flow alteration elements, extending from the surface of the rod 4. In this embodiment the protrusions 38 are fin-like protrusions 38. The protrusions are positioned and arranged (for example extending above and below the uppermost and bottom extremities of the longitudinal extensions of the rod 4 to provide a taller cross-section to the ambient flow direction 6 at parts of the rod 4) such that in operation some of the fluid impacts the protrusions 38, thereby providing additional sources of fine scale turbulence (hence additional vortices 30) and/or increasing the deflection of the vortices 30 into and/or out of the cavity 2, thereby further enhancing the thickening of the shear layer 22.

In embodiments where flow alteration elements are provided on one or more of the rods 4, such as those embodiments described above with reference to FIGS. 3-6, the following variations (i) to (vii) are, for example, possible.

(i) For one or more of the rods provided with flow alteration elements, the rod may comprise one or plural flow alteration elements. For example, where each flow alteration element is a channel through a rod, two or more channels may be provided on a single rod (or on each of a plurality of rods), the channels being arranged above each other and/or beside each other, for example.

(ii) Where the flow alteration elements are protrusions, and there are plural protrusions on a given rod, the plural protrusion may be provided all on the same side of the rod, or on both sides of the rod.

(iii) Where the flow alteration elements are protrusions, and there are plural protrusions on a given rod, one or more of the protrusions may extend a different distance from the rod, i.e. be of a different height, to other protrusions.

(iv) The flow alteration elements may be arranged perpendicular and/or parallel to sides and/or surfaces of a given rod, or may be at an oblique angle thereto.

(v) The flow alteration elements may be arranged perpendicular and/or parallel to the flow direction, or may be at an oblique angle thereto e.g. skewed.

(vi) For rods with plural flow alteration elements provided thereon, the plural flow alteration elements may all be channels, or may all be protrusions, or may be a mixture of each.

(vii) In the above embodiments with flow alteration elements on the rods, the flow alteration elements are channels through a rod and/or protrusions on the rod. However, in other embodiments any other forms of flow alteration elements may be provided additionally or alternatively. For example, one or more of the flow alteration elements may comprise a groove or other disturbance/irregularity in the surface or shape of the rod.

(viii) In the above embodiments a flow alteration element is a channel through a rod or a protrusion on a rod. Both of these types may be considered as elements that comprise or provide additional edges on or at the one or more rods that are in addition to the edge or edges provided by the underlying shape of the rod or rods. In other embodiments, in addition to or instead of the channels through a rod and/or protrusions on a rod, any other suitable type or types of flow alteration elements may be provided that comprise or provide additional edges on or at the one or more rods that are in addition to the edge or edges provided by the underlying shape of the rod or rods. In yet further embodiments, in addition to or instead of elements that comprise or provide additional edges on or at the one or more rods that are in addition to the edge or edges provided by the underlying shape of the rod or rods, any other suitable type or types of flow alteration elements may be provided that alter the flow so as to provide additional sources of fine scale turbulence (hence additional vortices 30) and/or increase the deflection of the vortices 30 into and/or out of the cavity 2, thereby further enhancing the thickening of the shear layer 22.

Returning to a more general discussion of further embodiments, in the above embodiments the rods 4 are all of circular cross-sectional shape. However, this need not be the case, and in other embodiments, the rods 4 may all be the same cross-sectional shape, where that shape is other than circular e.g. a non-circular curved shape, or a non-curved shape, e.g. rectangular.

In the above embodiments the rods 4 all extend completely across the width of the cavity 2. However, this need not be the case, and in other embodiments one or more of the rods 4 may extend only across a part of the width of the cavity 2, but this will be preferably at least half the width of the cavity 2, and yet more preferably over at least three quarters (¾) of the width of the cavity 2.

In the above embodiments the rods 4 are all the same length as each other and extend across the same extent of the width of the cavity as each other. However, this need not be the case, and in other embodiments one or more of the rods may be a different length to the other rods and/or may extend across a different extent of the width of the cavity as other rods.

In general it will be appreciated that any non-uniformity introduced into the form of one or more of the individual rods 4 (for example by, but not limited to, inclusion of one or more flow alteration elements as described earlier above) and/or any non-uniformity introduced between one or more of the different rods 4 and/or their relative arrangements/positions etc. will tend to provide the possibility of increased numbers or variations of sources of fine scale turbulence, with corresponding increased numbers of small vortices and/or thicker shear layer and/or increased disruption of the temporal coherence of the small vortices, any of which effects may further improve the suppression performance of the suppression system 1. The following further embodiments (i) to (v) are further examples of embodiments introducing or enhancing such non-uniformity.

(i) In the above embodiments the rods are all of the same (circular) cross-sectional shape as each other, and are all of the same diameter as each other. However, this need not be the case, and in other embodiments one or more of the rods may have a different cross-sectional shape and/or may have a different diameter or other relevant dimension to the other rods.

(ii) In the above embodiments the rods 4 each have a uniform cross-sectional shape along their entire length. However, this need not be the case, and in other embodiments one or more of the rods 4 may have a non-uniform cross-sectional shape along its entire length.

(iii) In the above embodiments the rods 4 are all spaced equidistantly apart from the adjacent rod 4 in the sense of the height direction, i.e. in the direction that extends away from the base 3 of the cavity 2 (and perpendicular to the flow direction 6), i.e. as shown schematically (not to scale) in FIG. 2 the respective distances $y_1 = y_2 = y_3$. However, this need not be the case, and in other embodiments one or more of the distances between adjacent rods 4 in the above mentioned direction may be unequal to the distance between two other adjacent rods 4 e.g. $y_1 \neq y_2 \neq y_3$, or $y_1 \neq y_2 = y_3$, and so on.

(iv) In the above embodiments, as shown schematically (not to scale) in FIG. 2, all the rods 4 are positioned directly above each other, i.e. each rod 4 is positioned at substantially the same distance x (in the direction along the cavity i.e. in the flow direction) from the leading edge 14. However, this need not be the case, and in other embodiments one or more of the rods 4 may be positioned at different distances (in the direction along the cavity i.e. in the flow direction) from the leading edge 14, i.e. one or more of the rods 4 may be offset from one or more of the other rods 4 in the direction along the cavity i.e. in the flow direction. This will tend to encourage shedding of the vortices 30 to occur at different times, i.e. at different stages of the formation of the shear layer 2 (by providing sources of fine scale turbulence at differing points in time along the flow), hence tending to further increase the extent of the disruption of temporal coherence between the different vortices 30 shed by the different rods. Any offset may be such that two rods are completely offset, i.e. there is no overlap, i.e. the difference between their respective differences is equal to or greater than the width of the rods, or may alternatively be with an overlap therebetween i.e. the difference between their respective differences is less than the width of the rods. Some examples of embodiments in which one or more of the rods 4 is offset from one or more of the other rods 4 in the direction along the cavity i.e. in the flow direction, are shown in FIG. 7 and FIG. 8. For example, one embodiment where all of the rods 4 are offset from all the other rods 4 is shown in FIG. 7, and one embodiment where some of the rods 4 are offset from some but not all of the other rods 4 is shown in FIG. 8. In FIG. 7 and FIG. 8 the suppression system 1 (not to scale) is viewed from the same side view as FIGS. 2 to 6 and the same reference numerals are used for the same features as were used in the earlier Figures.

(v) In the above embodiments all the rods 4 are positioned above the cavity 2 and displaced away from the leading wall 8 (closer to the leading wall 8 than the aft (trailing) wall 10). In other words, there is a gap between the rods 4 and the leading wall 8, and hence a gap between the rods 4 and the leading edge 14 in the flow direction 6. However, this need not be the case, and in other embodiments one or more of the rods 4 may be directly above the leading wall 8/leading edge 14. For the case of embodiments where the leading wall 8 is not parallel with the extension direction of the rods 4, in some of those embodiments, only some of the rod may be directly above the leading edge 14.

Returning to a more general discussion of further embodiments, in the above embodiments the rods 4 are positioned downstream of the leading edge 14 (i.e. above the cavity 2), and the rods 4 are positioned closer to the leading edge 14 than they are to the aft (trailing) edge 16. More particularly, in this embodiment the rods 4 are positioned such that the distance of the rods 4 from the leading edge 14 equals 0.05×the total distance between the leading edge 14 and the aft (trailing) edge 14. However this need not be the case, and in other embodiments the rods 4 may be positioned at any position downstream of the leading edge that is in the proximity of the leading edge. This may include, for example, any position downstream of the leading edge that is closer to the leading edge 14 than it is to the aft (trailing) edge 16, as some degree of suppression will still tend to occur. However, preferably the rods 4 are positioned closer to the leading edge than that, as then an even greater extent of the suppression effect will tend to occur. For example, as well as the preferred positioning at a distance downstream from the leading edge of 0.05×the total distance between the leading edge 14 and the aft (trailing) edge 16, even more preferred is any positioning at a distance of 0.05×the total distance, but also preferred more generally is positioning at a distance of 0.1×the total distance, and yet more generally any positioning at a distance of 0.2×the total distance.

In the above embodiments (all) the rods 4 are positioned downstream of the leading edge 14 (i.e. above the cavity 2). However, this need not be the case, and in other embodiments one or more of the rods may be positioned upstream of the leading edge 14, i.e. above the surface 19 rather than above the cavity 2. In such embodiments, the rods 4 may be positioned upstream from the leading edge 14 at any position in the proximity of the leading edge, which may be at any distance from the leading edge≤half the distance between the leading edge 14 and the aft (trailing) edge 16. Preferably, however, the rods 4 are positioned upstream from the leading edge at a distance from the leading edge≤0.2×the distance between the leading edge 14 and the aft (trailing) edge 16; more preferably at a distance from the leading edge≤0.1×the distance between the leading edge 14 and the aft (trailing) edge 16; and yet more preferably at a distance from the leading edge≤0.05×the distance between the leading edge 14 and the aft (trailing) edge 16. For example, one embodiment where all of the rods 4 are positioned upstream of the leading edge 14 is shown in FIG. 9, and one embodiment where some of the rods 4 are positioned upstream of the leading edge 14 and some of the rods are positioned downstream of the leading edge 14 (i.e. over the cavity 2) is shown in FIG. 10. In FIG. 9 and FIG. 10 the suppression system 1 (not to scale) is viewed from the same side view as FIGS. 2 to 8 and the same reference numerals are used for the same features as were used in the earlier Figures). Yet further, additionally one or more of the rods may be positioned directly over the leading edge 14, as discussed earlier above.

In the above embodiments, the cavity 2 is rectangular and comprises a planar base 3, the cavity 2 further comprises, defined relative to an actual or intended flow direction 6, a leading wall 8, an aft (trailing) wall 10, and two side walls 12, and these walls are all perpendicular to the planar base 3. However, these specific cavity details are not essential, and in other embodiments any other cavity shape may be present. For example, there need not be only four walls, the walls need not be straight or perpendicular, the cavity may be defined by one or more walls forming a curved or partially curved perimeter to the cavity, the perimeter may be irregularly shaped, one or more walls may be sloping, the base and or one or more walls may be undulating or sloped, and so on. However, the suppression will tend to occur more strongly the more straightforwardly the leading edge (compared to the actual or intended airflow direction) is defined or present.

Also, it will be appreciated that in embodiments with cavity shapes as described above, including irregularly shaped cavities, the skilled person will modify such directions described above as parallel, transverse, perpendicular, and the like, which are suitable for regularly shaped cavities, to provide other directions that achieve corresponding functionalities, at least to some extent, as those described above as parallel, transverse, perpendicular, and the like. Also, even when the cavity is regularly shaped, in yet further embodiments, directions that contain a resolved part of the described parallel, transverse, perpendicular, and the like direction may be implemented instead of completely parallel, transverse, perpendicular, and the like directions. For example, the rods may cross a rectangular cavity with a transverse direction that is at an oblique angle to the stated direction, but contains a resolved element of that direction and hence of its effect, for example at a direction of 15°, 30° or 45° to the direction parallel to the leading edge 14.

In the above embodiments the number of rods 4 in the plurality of rods 4 is four. However, this need not be the case, and in other embodiments there may be any other numbers of rods in the plurality, for example two, three, five and so on, although depending on the dimensions of the cavity and the rods, typically use of only two rods will give only some of the available beneficial effects, and the useful effect of further rods will typically diminish beyond six rods, hence a first preferred range for the number (n) of rods in the plurality of rods is n≥3, another preferred range for the number (n) of rods in the plurality is 2≤n≤6, and another preferred range for the number (n) of rods in the plurality is 3≤n≤6.

The above described surface in which the cavity is recessed may be a surface of a vehicle. The vehicle may be an aircraft, or a missile, or any other type of vehicle, for example a car or a lorry, or a sea vessel, including for example a submarine.

What is claimed is:

1. A cavity system, comprising:
a cavity (2) and a plurality of rods (4);
the rods (4) are positioned in the proximity of a leading edge (14) of the cavity (2), the leading edge (14) being relative to an actual or intended flow direction (6) of a fluid over the cavity (2);
each of the rods (4) extending lengthwise across at least a part of a width of the cavity (2) in a perpendicular or oblique angle to the actual or intended flow direction (6);
wherein one or more of the rods (4) is positioned further along the flow direction (6) compared to one or more of the other rods (4); and
wherein the positioning of one or more of the rods (4) further along the flow direction (6) compared to one or more of the other rods (4) provides a zig-zag pattern of rod positions.

2. The cavity system according to claim 1, wherein all the rods (4) are downstream of the leading edge (14).

3. The cavity system according to claim 1, wherein the rods (4) are positioned at a distance from the leading edge (14) that is ≤0.2×the distance between the leading edge (14) and an aft edge (16).

4. The cavity system according to claim 3, wherein the rods (4) are positioned at a distance from the leading edge (14) that is ≤0.1×the distance between the leading edge (14) and the aft edge (16).

5. The cavity system according to claim 4, wherein the rods (4) are positioned at a distance from the leading edge (14) that is ≤0.05×the distance between the leading edge (14) and the aft edge (16).

6. The cavity system according to claim 1, wherein the number (n) of rods in the plurality is 2≤n≤6.

7. The cavity system according to claim 6, wherein the number (n) of rods in the plurality is 3≤n≤6.

8. The cavity system according to claim 1, wherein the effect of the rods (4) is to increase the thickness (28) of the shear layer (22).

9. The cavity system according to claim 1, wherein one or more flow alteration elements (34, 38) are provided on one or more of the rods (4).

10. The cavity system according to claim 1, wherein at least some of the flow alteration elements (34, 38) comprise a protrusion (38) extending from the rod (4).

11. The cavity system according to claim 1, wherein the flow alteration elements (34, 38) are at different positions along the rod (4) on different rods (4).

12. The cavity system according to claim 1, wherein at least two different types of flow alteration elements (34, 38) are provided.

13. A cavity system, comprising:
a cavity (2) and a plurality of rods (4);
the rods (4) are positioned in the proximity of a leading edge (14) of the cavity (2), the leading edge (14) being relative to an actual or intended flow direction (6) of a fluid over the cavity (2);
each of the rods (4) extending lengthwise across at least a part of a width of the cavity (2) in a perpendicular or oblique angle to the actual or intended flow direction (6);
wherein one or more flow alteration elements (34, 38) are provided on one or more of the rods (4); and
wherein at least some of the flow alteration elements (34, 38) comprise a channel (34) passing through the rod (4).

14. The cavity system according to claim 13, wherein at least some of the flow alteration elements (34, 38) comprise or provide additional edges at the one or more rods (4) that are in addition to the edge or edges provided by the underlying shape of the rod or rods (4).

15. The cavity system according to claim 13, wherein at least some of the flow alteration elements (34, 38) comprise a protrusion (38) extending from the rod (4).

16. The cavity system according to claim 13, wherein the flow alteration elements (34, 38) are at different positions along the rod (4) on different rods (4).

17. The cavity system according to claim 13, wherein at least two different types of flow alteration elements (34, 38) are provided.

18. A cavity system, comprising:
a cavity (2) and a plurality of rods (4);
the rods (4) are positioned in the proximity of a leading edge (14) of the cavity (2), the leading edge (14) being relative to an actual or intended flow direction (6) of a fluid over the cavity (2);
each of the rods (4) extending lengthwise across at least a part of a width of the cavity (2) in a perpendicular or oblique angle to the actual or intended flow direction (6);
wherein one or more of the rods (4) is positioned further along the flow direction (6) compared to one or more of the other rods (4);
wherein the positioning of one or more of the rods (4) further along the flow direction (6) compared to one or more of the other rods (4) provides a zig-zag pattern of rod positions;
wherein one or more flow alteration elements (34, 38) are provided on one or more of the rods (4); and
wherein at least some of the flow alteration elements (34, 38) comprise a channel (34) passing through the rod (4).

19. The cavity system according to claim 18, wherein the flow alteration elements (34, 38) are at different positions along the rod (4) on different rods (4).

20. The cavity system according to claim 18, wherein at least two different types of flow alteration elements (34, 38) are provided.

* * * * *